United States Patent [11] 3,631,364

[72] Inventors William Alan Schilb
Lombard;
Donald Lindsey Booth, Chicago, both of Ill.
[21] Appl. No. 2,302
[22] Filed Jan. 12, 1970
[45] Patented Dec. 28, 1971
[73] Assignee Motorola, Inc.
Franklin Park, Ill.

[54] COMPACT, DIRECT FM MODULATOR PROVIDING CONSTANT DEVIATION ON EACH OF A PLURALITY OF ADJUSTABLE CENTER FREQUENCIES

11 Claims, 3 Drawing Figs.

[52] U.S. Cl. .......... 332/26, 307/320, 331/36 C, 331/49, 331/56, 331/177 V, 332/30 V
[51] Int. Cl. .......... H03c 3/22, H03c 3/28
[50] Field of Search .......... 332/26, 30 V; 331/36 C, 177 V, 49, 56; 307/320

[56] References Cited

UNITED STATES PATENTS

| | | | |
|---|---|---|---|
| 3,528,032 | 9/1970 | Tahmisian et al. | 332/26 X |
| 3,516,000 | 6/1970 | Slechta | 307/320 X |
| 2,494,321 | 1/1950 | Usselman | 331/49 |
| 2,925,563 | 2/1960 | Firestone | 332/26 |
| 3,154,753 | 10/1964 | Rusy | 332/26 |

FOREIGN PATENTS

| | | | |
|---|---|---|---|
| 1,005,937 | 9/1965 | United Kingdom | 331/177 V |

*Primary Examiner*—Alfred L. Brody
*Attorney*—Mueller and Aichele

ABSTRACT: A multiple center frequency, direct FM modulator includes an oscillator having a plurality of center frequency determining circuits each of which is comprised of a piezoelectric crystal and a warping coil. A switch connects a selected center frequency determining circuit between a varactor and the active element of the oscillator. The capacitance of the varactor is changed by a modulating voltage to provide frequency deviation about the center frequency of oscillation. The crystal has an undesirable tendency to change the deviation corresponding to a given change in varactor capacitance, as the inductance of the warping coil associated therewith is changed. To compensate for this undesirable change in deviation, the values of the components in the frequency controlling circuit of the oscillator are selected such that adjustment of the warping coil causes a change in the variation of equivalent capacitance connected with the crystal so that the frequency deviation corresponding to a modulating voltage of a given amplitude remains constant.

Inventors
WILLIAM ALAN SCHILB
DONALD LINDSEY BOOTH
BY
Mueller, Aichele & Rauner
ATTYS.

COMPACT, DIRECT FM MODULATOR PROVIDING CONSTANT DEVIATION ON EACH OF A PLURALITY OF ADJUSTABLE CENTER FREQUENCIES

BACKGROUND OF THE INVENTION

Because the already substantial number of frequency modulated (FM) transmitters operating within limited frequency bands is increasing, it is continually becoming more important that the maximum deviation of each transmitter be held within limits prescribed by FCC regulations so that transmissions on adjacent channels do not interfere with each other. Furthermore, since the receiver in an FM communication system is usually designed to have a specific bandwidth, distortion of the transmitted intelligence will result if the deviation and, hence, the bandwidth of the transmitted signal is greater than that which the receiver is designed to accept. Alternatively, as the deviation is reduced so that the bandwidth of the transmitted signal is much less than the maximum permitted by FCC regulations, noise has an increasingly deleterious effect on the FM transmission.

Piezoelectric crystals are utilized in the center frequency and deviation determining circuits of direct FM transmitters for providing substantially constant center frequencies of oscillation. Because the frequency of oscillation is dependent on the equivalent reactance connected with the crystal, warping elements comprised of passive inductors or capacitors are often connected therewith for making fine adjustments in the center frequency. Moreover, a varactor or voltage variable capacitor whose capacitance changes in proportion to the amplitude of a modulating voltage applied thereacross is sometimes coupled to the crystal to produce changes in the equivalent reactance which result in frequency deviation or FM about the center frequency.

In some modulators the crystal is operated in an antiresonant mode wherein the crystal appears to be essentially an inductor. In these modulators, the amount of frequency deviation created by a modulating voltage of given amplitude depends partly on the sensitivity of the crystal, which varies as a function of the total equivalent capacitance. Therefore, each time the center frequency is adjusted by changing the reactance of a warping element to change the total equivalent capacitance, the deviation tends to change even though the amplitude of the modulating voltage remains constant. In a modulator providing only a single center frequency, the amplitude of the modulating voltage can be adjusted to compensate for this undesirable change in deviation.

In a multicenter frequency FM modulator of one design, however, selected ones of a plurality of center frequency determining networks, each of which perhaps having a different composite reactance, are selectively switched one at a time into connection with a single varactor. Each network which is switched into connection with the varactor may undesirably provide a different amount of deviation corresponding to a modulating signal of a given fixed amplitude. This is because of the resulting change in total equivalent capacitance connected with the crystal thereof. It is often impracticable to readjust the amplitude of the modulating voltage to compensate for this change in deviation each time the center frequency determining element is switched. Hence, the unwanted change in maximum deviation may make modulators of the foregoing kind unsuitable, for instance, in transmitters where the output frequency of the modulator is multiplied many times before transmission thereof. To overcome this problem, some prior art FM transmitters providing multiple center frequencies have an entirely separate, direct FM modulator for each center frequency whose deviation has been preadjusted. The modulator systems of these transmitters, which contain a plurality of separate modulators, are more expensive, take up more space and have more weight than a single, center frequency modulator. The increased space and weight requirements of these prior art, direct FM modulators make them particularly undesirable for use in portable, handheld transmitters.

SUMMARY OF THE INVENTION

It is an object of this invention to provide a reliable, multifrequency, crystal controlled, direct FM modulator comprising a simple, compact, lightweight and inexpensive circuit which includes a minimum number of parts.

Another object of the invention is to provide a frequency modulated, crystal controlled oscillator which provides substantially constant deviation, for a given amplitude of modulating voltage, even though its center frequency is adjusted.

Still another object of the invention is to provide a simple, compact, inexpensive, frequency modulated, crystal controlled oscillator which provides a plurality of center frequencies wherein the frequency deviation about each center frequency remains constant, if the amplitude of the modulating voltage remains constant, even its center frequencies are adjusted.

A further object of the invention is to provide a solid state, frequency modulated, crystal controlled oscillator including a voltage variable capacitor, which provides any one of a plurality of adjustable center frequencies, with constant maximum deviation thereabout and wherein each of the center frequencies can be easily selected or adjusted by the transmitter operator.

In one embodiment of the invention, a frequency modulated, crystal controlled oscillator is comprised of an electron device for sustaining oscillations which has a control circuit connected therewith for controlling the frequency of the oscillations. This control circuit includes at least one center frequency determining circuit comprised of the series connection of a crystal, which is resonant at a frequency determined partly by the equivalent capacitance connected therewith, and an adjustable inductor. The inductor is adjustable to change the equivalent capacitance, thereby changing the center frequency of oscillation. A voltage variable capacitor is coupled to the center frequency determining circuit and to a source of modulating voltage which dynamically changes the capacitance thereof to cause changes in the equivalent capacitance. These dynamic changes in the equivalent capacitance produce deviation in the frequency of oscillation in accordance with the variation of the amplitude of the modulating voltage. As the inductance of the foregoing inductor is changed, however, the crystal has a tendency to change the deviation resulting from a modulating voltage having a given fixed amplitude. To compensate for this undesirable tendency, the values of the components in the oscillator circuit are selectively chosen such that the variation of the inductor also changes the variation in equivalent capacitance provided by the change in capacitance of the voltage variable capacitor in response to the modulating voltage of given amplitude.

DESCRIPTION OF THE PREFERRED EMBODIMENT

Figures 1, 2A, 2B:
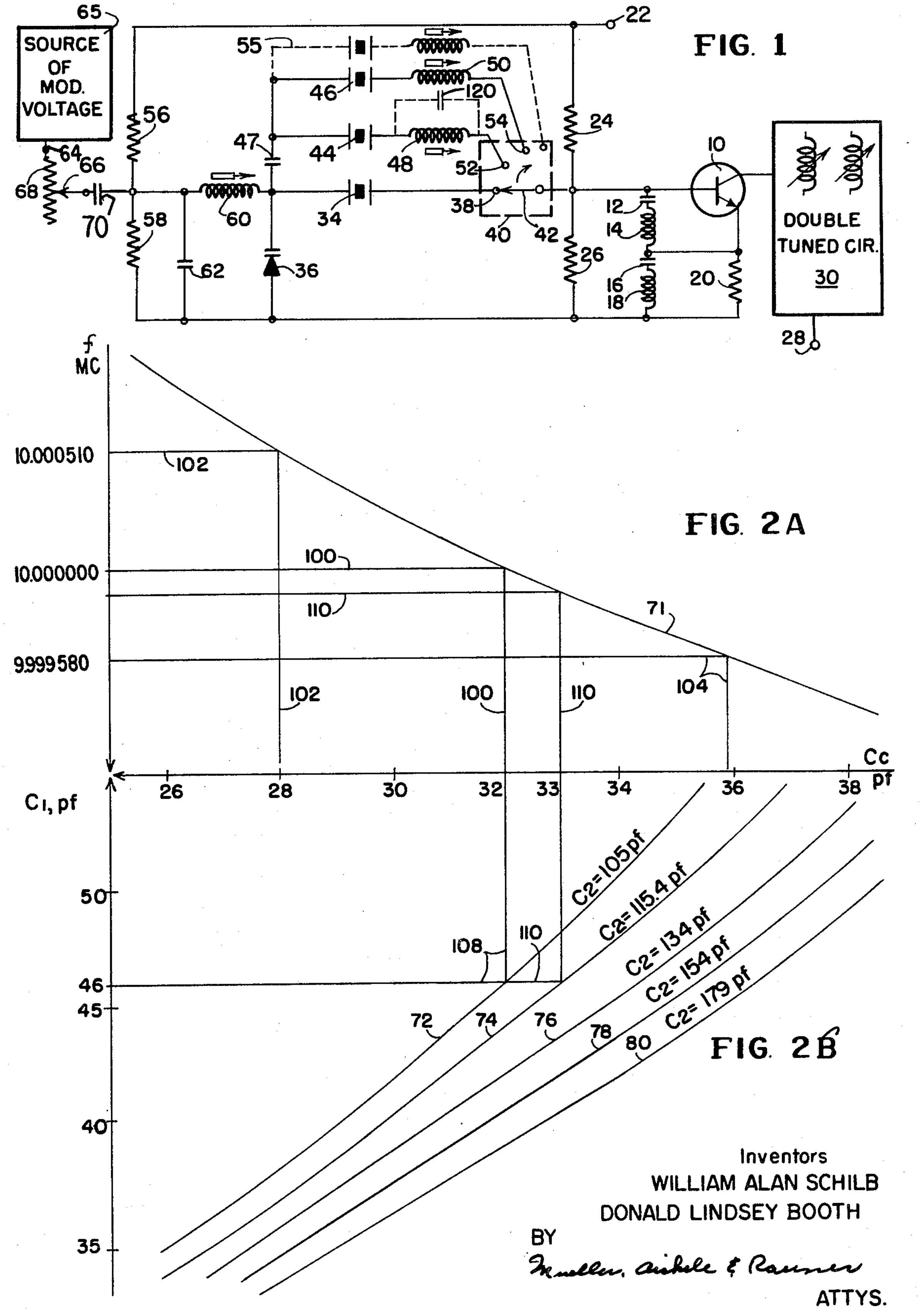
FIG. 1 is a circuit diagram of a crystal controlled, frequency modulated oscillator of one embodiment of the invention; and, FIGS. 2A and 2B are graphs illustrating the operation of the circuit of FIG. 1.

Referring to FIG. 1, the circuit of the modulator of one embodiment of the invention includes transistor 10 whose base electrode is connected through the series combination of capacitor 12 and inductor 14 to its emitter electrode. In addition, the emitter electrode is connected through the series combination of capacitor 16 and inductor 18 to a reference or ground potential. Resistor 20, which is also connected between the emitter and ground, provides a signal which is fed back to the base electrode to cause and sustain oscillation. Capacitors 12 and 16, which determine the feedback ratio, are relatively large in value so that they have little effect on the frequency of oscillation and on modulation sensitivity which may be defined as the ratio of the deviation, or frequency change away from center frequency, to the amplitude of the modulating voltage.

A bias potential is applied from terminal 22 of a regulated power supply through the voltage divider comprised of resistors 24 and 26 whose junction is connected to the base of transistor 10. Collector bias is applied from power supply terminal 28 through double tuned output circuit 30 to the collector electrode of transistor 10. Terminals 22 and 28 can be energized from the same supply, but it is especially important that the potential at terminal 22 have a high degree of regulation.

One center frequency determining circuit for the oscillator includes piezoelectric crystal 34 which is connected between the cathode of voltage variable capacitor 36 and fixed contact 38 of switch 40. Crystal 34, which can be selectively connected through movable portion 42 of switch 40 to the base electrode of transistor 10, operates in an antiresonant mode and it is especially designed to allow a relatively large deviation of the oscillator frequency. At the corresponding center frequency of oscillation the crystal 34 presents a low inductance on the order of 7 microhenries and the difference between its series and parallel resonant frequencies may be on the order of 440 parts per million (p.p.m.) to allow a maximum deviation of 167 p.p.m. Crystal 44 resonates with the instantaneous value of total equivalent capacitance connected therewith to determine the instantaneous frequency of oscillation of the modulator. Crystals 44 and 46, which are electrically coupled to varactor 36 through capacitor 47, have electrical characteristics that are similar to the foregoing characteristics of crystal 34 but these crystals are designed to be antiresonant at other preselected center frequencies. They are respectively connected through adjustable frequency warping inductors 48 and 50 to fixed contacts 52 and 54 of switch 40. If additional center frequencies are desired, additional center frequency determining networks 55 can be added to the oscillator configuration.

The capacitance, $C_{36}$ of the varactor varies with the amplitude of the voltage impressed thereacross. A steady state bias voltage provided by the regulated potential at power supply terminal 22 is applied across capacitor 62 by the voltage divider comprised of resistors 56 and 58 and through variable inductor 60 to the cathode of varactor 36. The dynamic capacitance of the varactor varies about this steady state value in proportion to the amplitude of the modulating voltage applied at terminal 64 from source of modulating voltage 65. This modulating voltage is connected through adjustable portion 66 of variable resistor 68, DC blocking capacitor 70, and variable inductor 60 to the cathode of varactor 36. The variation in the capacitance of varactor 36 changes the total equivalent capacitance, $C_r$, connected with whatever crystal has been selected by switch 40 thus producing FM or deviation in the frequency of oscillation. The values of inductor 60 and capacitor 62 are selected to insure that the change in frequency deviation or FM varies linearly with the change in amplitude of the modulating voltage. Variable resistor 68 may be adjusted to provide a selected maximum amplitude of modulating voltage for determining the maximum frequency deviation for a given adjustment of inductor 60.

For purposes of explanation, assume that movable portion 42 of switch 40 is connected to fixed contact 52 thereby connected the frequency determining circuit comprised of crystal 44 and inductor 48 to transistor 10. As previously mentioned, the instantaneous frequency of oscillation will depend on the instantaneous value of total equivalent capacitance $C_r$ connected in parallel with crystal 44. $C_r$ can be defined in terms of $C_1$ which is the equivalent capacitance of the varactor and its associated circuitry and $C_2$ which is the equivalent capacitance of the rest of the reactive elements connected with crystal 44. The equivalent capacitor $C_1$ presented by varactor 36, inductor 60, and capacitor 62 is defined below:

$$C_1 = C_{36} - \frac{1}{w^2 L_{60} - \frac{1}{C_{62}}} \qquad (a)$$

wherein $C_{36}$ = instantaneous capacitance of varactor 36
$W$ = 2 pi × the frequency of oscillation, $f$
$L_{60}$ = inductance of inductor 60

$C_{62}$ = capacitance of capacitor 62

The capacitance of capacitor 70 is not included in equation (a) because its contribution is negligible at the frequency of oscillation.

The equivalent capacitance $C_2$, presented by capacitor 47, inductor 48, capacitor 12 and capacitor 16, is expressed by the following equation:

$$C_2 = \frac{1}{\frac{1}{C_{12}} + \frac{1}{C_{16}} + \frac{1}{C_{47}} - w^2 L_{48}} \qquad (b)$$

wherein $C_{12}$ = capacitance of capacitor 12
$C_{16}$ = capacitance of capacitor 16
$C_{47}$ = capacitance of capacitor 47
$W$ = 2 pi × the frequency of oscillation, $f$
$L_{48}$ = the inductance of warping coil 48.

The inductances of inductors 14 and 18 are not included in equation (b) because their contributions to $C_2$ are negligible. The total equivalent capacitance $C_r$ is, therefore, equal to the series combination of capacitances $C_1$ and $C_2$ as follows:

$$C_r = (C_1 \cdot C_2)/(C_1 + C_2) \qquad (c)$$

Graph 71 of FIG. 2A, which represents the characteristics of crystal 44, illustrates the frequency of oscillation, $f$ corresponding to an equivalent capacitance, $C_r$ connected with crystal 44. As shown by graph 71, if $C_r$ decreases the frequency of oscillation, $f$ increases. Thus, as reflected by the following guide lines 100 and 102 on FIG. 2A, if the equivalent capacitance $C_r$ is decreased from 32 to 28 pf., the frequency of oscillation, $f$ is increased from 10 to 10.000510 megahertz. Alternatively, as shown by following guide lines 100 and 104, if the equivalent capacitance $C_r$ is increased from 32 to 36 pf. the frequency of oscillation $f$ is decreased from 10 to 9.999580 megahertz. As shown by equations (a) (b) and (c), a change in the inductance of either inductor 60 or inductor 48 causes a change in $C_r$ and a change in $f$. For example, if inductance $L_{48}$ is decreased then $C_2$ is decreased and $C_r$ is also decreased to thereby raise $f$. The slope of graph 71 in FIG. 2A, which is determined by the sensitivity of the crystal is defined by the ratio of ($\Delta f$), the change in frequency of the oscillator, to ($\Delta C_r$) the change in $C_r$, i.e., sensitivity is proportional to ($\Delta f/\Delta_r$). Note that the crystal becomes more sensitive as $C_r$ is reduced, for instance, by decreasing the warping inductance $L_{48}$. This is illustrated by the increase of the slope of graph 71 with decreasing $C_r$.

Graphs 72, 74, 76, 78 and 80 of FIG. 2B, show $C_r$ as a function of both $C_1$, which depends on the varactor capacitance $C_{36}$, and of $C_2$ which depends on the inductance of warping inductor $L_{48}$. Each of these graphs correspond to a particular value of $C_2$. For instance, as reflected by following solid guide line 108 on FIG. 2B, if $C_1$ equals 46 pf. and $C_2$ equals 105 pf., the correlation capacitance $C_r$ is equal to 32 pf. and, hence, the frequency of oscillation is 10 megacycles. Moreover, if $C_1$ remains equal to 46 pf. and warping inductor 48 is adjusted so that $C_2$ equals 115.4 pf., guide line 110 shows that the correlation capacitance will be about equal to 33 pf. and frequency of oscillation $f$ will be some value less than 10 Mc. Each value of $C_2$ is determined by $L_{48}$ as shown by equation (b). The inverse or reciprocal of the slope of a graph in FIG. 2B is the ratio of the change in $C_r$ to a change in $C_1$ ($\Delta C_r/\Delta C_1$). The change of $C_1$ depends on the change in the capacitance of varactor 36. Note that the reciprocal of the slope decreases as $C_2$ decreases due to a reduction in $L_{48}$. Therefore, the effect of a given change in varactor capacitance $C_{36}$ tends to provide less change in $C_r$ as $L_{48}$ is reduced.

By selectively choosing the values of the components in the circuit of FIG. 1, the noted foregoing tendency of the sensitivity of the crystal to increase the deviation; and, the noted foregoing decrease in variation of equivalent capacitance, for a given change in the capacitance of varactor 36, thus tending to decrease the deviation, can be utilized to cancel each other out as $L_{48}$ is decreased so that the deviation remains constant. Alternatively, as $L_{48}$ is increased, the tendency of the crystal to decrease the deviation can be cancelled by the tendency of the change in variation of equivalent capacitance to increase the deviation for a given change in the capacitance of varactor 36, thus again maintaining constant deviation for a modulating voltage of constant amplitude. Although the foregoing analysis has been described with respect to $L_{48}$, it could have been made with respect to $L_{50}$ or the inductor in center frequency determining circuit 55.

The result of balancing the foregoing, counteracting influences on deviation, therefore, is constant deviation in response to a modulating voltage of constant amplitude, even though the equivalent capacitance is readjusted by variation of a warping element which changes the center frequency of oscillation. Mathematically, the tendency of crystal 44 to produce a given change in deviation in cooperation with the tendency of the variation of equivalent capacitance to produce the opposite change in deviation in response to a change in warping inductor 48 will balance if:

$$\left\{\frac{\Delta C_e}{\Delta C_1}\right\}\left\{\frac{\Delta f}{\Delta C_e}\right\}\simeq\text{constant} \qquad (d)$$

The first term of (d) is defined by, $$\frac{\Delta C_e}{\Delta C_1}=1-2\frac{C_e}{C_2}+\left\{\frac{C_e}{C_2}\right\}^2 \qquad (e)$$

and the second term of (d) is defined by, $$\frac{\Delta f}{\Delta C_e}=\frac{-K}{C_e^2+2C_eC_o+C_o^2} \qquad (f)$$

wherein $C_0$ = parallel capacitance associated with the crystal itself $K$ = $A\,(C_o+C_{cr})$ $C_{cr}$ = reference correlation capacitance e.g. 32 pf.

$A$ = $(f_c - f_s)/f_s$ $f_{cr}$ = frequency of oscillator when $C_e = C_{cr}$ $f_s$ = series resonant frequency of the crystal The above system of equations may be solved by trial and error by making use of well-known computer techniques to give selected values for the components to be used in the oscillator circuit. The solution is simplified by the fact that only components having certain values are readily available from manufacturers. By methodically substituting the values of these components into the equations, an optimum solution can be obtained.

In a circuit oscillating about center frequencies from 10 to 11.6 megahertz, which is satisfactory for commercial use, the components have been found to have the following values by using the foregoing mathematical technique:

| | |
|---|---|
| Transistor 10 | Motorola part 48R69444, NPN |
| Capacitor 12 | 220 picofarads |
| Inductor 14 | 110 nanohenries |
| Capacitor 16 | 680 picofarads |
| Inductor 18 | 35 nanohenries |
| Resistor 20 | 680 ohms |
| Resistor 24 | 10 kΩ |
| Resistor 26 | 10 kΩ |
| Crystal 34 | YNTR, Motorola type |
| Crystal Varactor 36 | MV1650 100 pf. at 4 v. |
| Crystal 44 | YNTR |
| Crystal 46 | YNTR |
| Capacitor 47 | 70 picofarads |
| Inductor 48 | 22 turns, No. 32 wire |
| Resistor 56 | 22 kΩ |
| Resistor 58 | 15 kΩ |
| variable resistor 68 | 0–10 kΩ |
| Inductor 60 | 25 turns, No. 36 wire |
| Capacitor 62 | 0.002 microfarads |
| Capacitor 70 | 1 microfarad |

Voltage at point 22 is 6.4 v.

If it is desired to increase the warp range or center frequency adjusting capability provided by warping inductor 48, for instance, a small capacitor 120 can be connected in parallel with the inductor 48 thus enabling the warping inductor to provide a greater range of inductance. The value of this capacitor should be selected so that the resonant frequency of the combination of the capacitor and inductor is different from the antiresonant frequency of the crystal. Furthermore, the value of capacitor 47 in cooperation with the inductance of a warping coil is chosen to be series resonant at the center frequency of the corresponding crystal and at the midrange of the warping coil. The inductances of coil 14 in combination with capacitor 12 and the inductance of coil 18 in combination with capacitor 16 are chosen to provide a short circuit for any unwanted spurious frequency responses of the piezoelectric means. In the foregoing example these combinations were chosen to be series resonant at 3*f*.

In adjusting the center frequencies and deviation of the foregoing embodiment of the invention, movable portion 42 of switch 40 is first placed in connection with fixed contact 38 and crystal 34 is warped to the desired center frequency by adjusting inductor 60. Next, the maximum amount of deviation is adjusted to be within prescribed limits by selecting the maximum amplitude of the modulating voltage applied to varactor 36 through adjusting movable portion 66 of variable resistor 68. Finally, movable switching portion 42 is rotated to fixed contacts 52, 54, etc., and the inductance of respective warping coils 48, 50, etc., are varied to warp respective crystals 44, 46, etc., to their desired center frequencies without changing the amount of deviation corresponding to a given amplitude of modulating voltage across varactor 36. It is emphasized that crystal 34 must be set to its desired center frequency by adjusting the inductance $L_{60}$ before the deviation is set by variable resistor 66 because the deviation varies as a function of $L_{60}$ whereas it does not vary as a function of $L_{48}$, $L_{50}$, etc.

The described modulator circuit, therefore, enables the addition of a second center frequency by the inclusion of three components, i.e., capacitor 47, crystal 44, and inductor 48, to the basic oscillator circuit. Moreover, each of third, fourth, etc., center frequencies are added by including only two components, i.e., a crystal and warping inductor. Accordingly, even when a plurality of center frequencies are added the resulting structure is simple, compact, lightweight and inexpensive. Furthermore, movable portion 42 of switch 40 can be readily switched by an operator to select any one of a plurality of center frequencies; each of which, other than the one provided by crystal 34, may be readily readjusted without adversely affecting the deviation.

We claim:

1. In a direct, frequency modulated oscillator having an electron device for sustaining oscillation and a frequency controlling circuit connected to said electron device for controlling the frequency of oscillation, the frequency controlling circuit being adapted to facilitate center frequency adjustment without causing a change in deviation and including in combination: a center frequency determining circuit comprised of a piezoelectric element and adjustable reactive means, said center frequency determining circuit having first and second terminals, said first terminal being connected to the electron control device, said piezoelectric element being resonant at a frequency determined by an equivalent reactance connected therewith, said adjustable reactive means being adjustable to change said equivalent reactance to thereby adjust the center frequency of oscillation; voltage variable capacitor means coupled to said second terminal of said center frequency determining circuit and forming part of said equivalent reactance; means applying a modulating voltage to said voltage variable capacitor means to change the capacitance thereof thus varying said equivalent reactance to deviate the frequency of oscillation, said piezoelectric element having a tendency to change the deviation as said adjustable reactive means is adjusted, the values of the components of the frequency controlling circuit being selectively chosen such that a change in said variation of said equivalent reactance provided by said voltage variable capacitor means is produced by said adjustment of said adjustable reactive means, said change in the variation of said equivalent reactance compensating for said tendency of the piezoelectric element to change the deviation.

2. The combination of claim 1 wherein said piezoelectric element is a quartz crystal constructed to have a low inductance on the order of 7 microhenries at the center frequency of oscillation and wherein the difference between the series resonant frequency of said quartz crystal and the antiresonant frequency thereof is on the order of 440 parts per million.

3. The combination of claim 1 wherein said frequency controlling circuit includes a plurality of said center frequency determining circuits each having first and second terminals, first circuit means coupling said second terminal of one of said center frequency determining circuits to said voltage variable capacitor means; and second circuit means selectively connecting one of said first terminals to the electron device for determining different center frequencies of oscillation, any of said center frequency determining circuits being adjusted by adjusting said corresponding adjustable reactive means without changing the frequency deviation caused by a modulating voltage having a constant amplitude.

4. The combination of claim 1 wherein said adjustable reactive means includes an adjustable inductor which is connected in series with said piezoelectric element.

5. A frequency modulated crystal controlled oscillator, including in combination: an electron device; a first center frequency determining circuit having a first piezoelectric crystal, a second center frequency determining circuit comprised of the series connection of a second piezoelectric crystal and an associated variable reactance means, each of said crystals being responsive to the equivalent reactance connected therewith to individually determine a center frequency of oscillation, voltage variable capacitor means connected to at least one of said center frequency determining elements, means coupling a modulating signal to said voltage variable capacitor means to change the capacitance thereof thus varying said equivalent reactance to deviate the frequency of oscillation, switching means selectively connecting one of said first and second frequency determining circuits between said electron device and said voltage variable capacitor means, said second crystal when connected to said electron control device having a tendency to increase the deviation as the reactance of said associated variable reactance means is decreased and a tendency to decrease the deviation as the reactance of said variable reactance means is increased, the values of the components of the oscillator being selectively chosen such that said change in the capacitance of the voltage variable capacitor provides a decreased change in said equivalent reactance as said reactance of said variable reactance means is decreased and an increased change in said equivalent reactance as said reactance of said variable reactance means is increased to compensate for said tendency of said second crystal to change the deviation.

6. The oscillator of claim 5 wherein each of said piezoelectric crystals is a quartz crystal constructed to have a low inductance on the order of 7 microhenries at the center frequency of oscillation and wherein the difference between the series resonant frequency of said quartz crystal and the antiresonant frequency thereof is on the order of 440 parts per million.

7. The oscillator of claim 5 wherein a circuit branch including a series connected capacitor and inductor is connected in parallel with said voltage variable capacitor; said modulating voltage is applied to the junction between said series connected inductor and capacitor, and the values of said capacitor and inductor are selectively chosen so that the frequency deviation varies linearly with the amplitude of said modulating voltage.

8. The oscillator of claim 5 wherein said variable reactance means includes a variable inductor.

9. The oscillator of claim 5 wherein said electron device is a transistor.

10. In a frequency modulated oscillator comprised of an amplifier having an electron device and a frequency controlling feedback network, said feedback network including in combination, voltage variable capacitor means, a first piezoelectric crystal having first and second terminals, said first terminal being connected to said voltage variable capacitor means, first circuit means comprised of a series connected first variable inductor and capacitor, said first circuit means being connected across said voltage variable capacitor, source of modulating voltage coupled to the point between said first variable inductor and capacitor of said first circuit means, second circuit means having first and second terminals and comprised of a second piezoelectric crystal connected in series with a second variable inductor, said first terminal of said second circuit means being coupled to the first terminal of said first piezoelectric crystal, switching means having a plurality of input terminals and a sole output terminal, said switching means being operable to connect any one of said plurality of input terminals to said output terminal, said output terminal of the switching means being connected to the electron device, said second terminal of the first piezoelectric means being connected to one of said plurality of said input terminals of the switching means, said second terminal of said second circuit means being connected to another of said input terminals of the switching means, said switching means being operable to connect either said second circuit means or said first piezoelectric means to said electron device to thereby select either of two center frequencies of oscillation, said selected frequency of oscillation being deviated in response to changes in the capacitance of said voltage variable capacitor means in response to a modulating voltage, adjustment of said second variable inductor tending to change the deviation when said second circuit means is connected to said electron device, said components of the oscillator being selected so that the effect of said change in capacitance of said voltage controlled capacitor is changed as said second variable inductor is adjusted to counterbalance said tendency of said deviation to change with said adjustment.

11. The combination of claim 10 further including a plurality of said second circuit means, said first terminals of said plurality of circuit means all being coupled to said voltage variable capacitor means, each of said second terminals of said plurality of the second circuit means being connected to separate ones of said plurality of input terminals of said switching means.

* * * * *